No. 836,032. PATENTED NOV. 13, 1906.
J. J. HAMMER.
GRAPHOPHONE.
APPLICATION FILED DEC. 30, 1905.
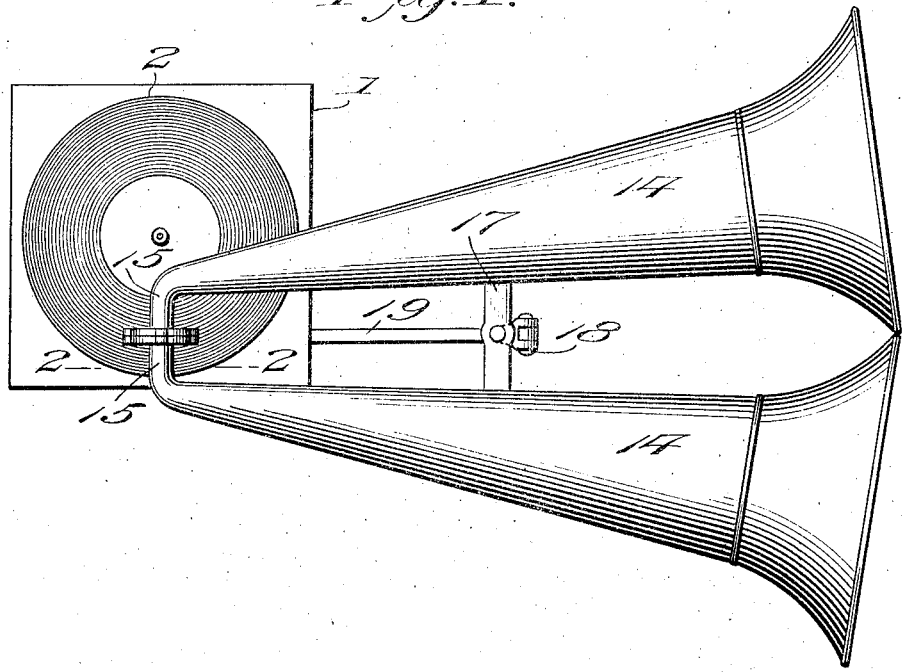
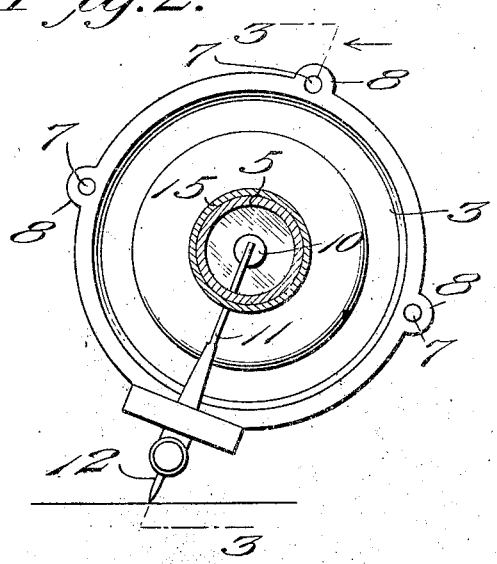
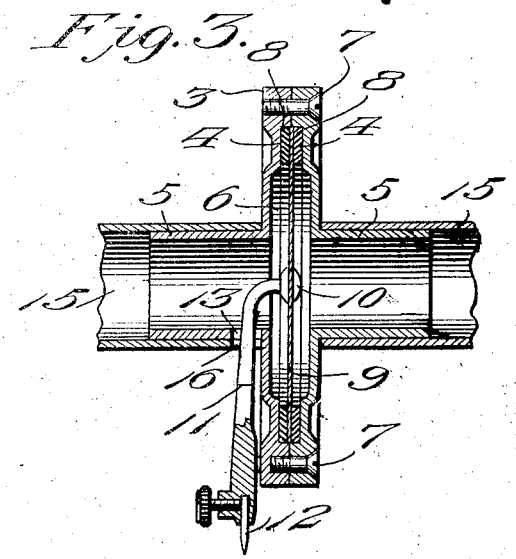
Witnesses
Edwin G. McKee,
P. M. Smith
Inventor
J. J. Hammer
By Victor J. Evans
Attorney

UNITED STATES PATENT OFFICE.

JUSTIN J. HAMMER, OF RED BLUFF, CALIFORNIA.

GRAPHOPHONE.

No. 836,032.

Specification of Letters Patent.

Patented Nov. 13, 1906.

Application filed December 30, 1905. Serial No. 293,964.

*To all whom it may concern:*

Be it known that I, JUSTIN J. HAMMER, a citizen of the United States, residing at Red Bluff, in the county of Tehama and State of California, have invented new and useful Improvements in Graphophones, of which the following is a specification.

The invention relates to an improvement in graphophones comprehending specifically a means for intensifying the sound reproduced by the instrument.

The main object of the present invention is the production of a sound-box of a particular construction in the use of which the sound-waves are taken from each side the diaphragm, whereby to intensify the quantity and improve the quality of the sound.

The invention will be described in the following specification, reference being had particularly to the accompanying drawings, in which—

Figure 1 is a plan view showing a graphophone provided with my improved sound-reproducer. Fig. 2 is an enlarged section on line 2 2 of Fig. 1. Fig. 3 is a section on line 3 3 of Fig. 2.

Referring to the drawings, it will be noted that my improved sound-reproducer is designed primarily for use in connection with the graphophone, as 1, of the type using the ordinary disk record, as 2.

The invention specifically comprehends a new and improved sound-box, which is shown in Fig. 3 and consists of duplicate disk-like members 3, circumferentially reduced on their approximate faces to provide recesses 4 and centrally provided with the concentrically-arranged laterally-projecting sleeve 5. The face of each disk between the sleeve 5 and the inner edge of the recess 4 is cut away to provide an enlarged recess 6, said recesses together forming the sound-chamber of the box.

The disks are secured together by screws 7, passed through radially-projecting ears 8, extending from each of the disks and designed to be transversely alined. The recesses 4 of said disks are designed to receive annular strips of suitable deadening material, 8, as rubber, between which the diaphragm 9 of the sound-box is clamped in securing the disks together.

The usual head 10 is secured centrally of the diaphragm, from which depends an arm 11, carrying the usual removable stylus 12, the arm projecting to one side of the diaphragm and passing through an opening 13 formed in one of the sleeves 5. Duplicate horns 14 are used in connection with the sound-box, the smaller end 15 of each of which is preferably of flexible material and of a size to snugly fit the sleeves 5 of the sound-box, that end 15 which fits under the sleeve formed with the perforation 13 being also provided with an opening 16, designed to register with the openings 13 to permit passage of the arm 11. As thus constructed and arranged the sound-waves occasioned by the movement of the diaphragm will be taken from both sides of said diaphragm and delivered simultaneously through the horns 14, thereby materially intensifying the quality of the sound delivered. Furthermore, as the sleeves 5 and sound-chambers 6 on each side of the diaphragm are exactly duplicated in size and construction, there will be no retarding or reflection of the sound-waves on one side of the diaphragm which are not duplicated on the other, whereby the effect of the diaphragm is identical in both sound-chambers, with the result to materially improve the quality of the same.

The duplicate horns 14 are preferably supported on a cross-bar 17, pivotally mounted upon a stud 18, having hinged connection with an arm 19, fixed to the graphophone, whereby to enable the horn to follow the sound-box in its accommodation to the irregularities of the record.

Having thus described the invention, what is claimed as new is—

1. A sound-box comprising duplicate disks formed with centrally-arranged laterally-projecting sleeves, each of said disks being formed with a central recess arranged to provide a sound-chamber, a diaphragm secured between and held by the disks when connected, the sound-chamber of each disk being identical on each side of the diaphragm, a horn arranged for connection with each sleeve, and a stylus-arm secured to the box and projecting through an opening formed in one of the sleeves.

2. A sound-box comprising duplicate disks formed with centrally-arranged laterally-projecting sleeves, each of said disks being circumferentially reduced to provide a recess, and centrally reduced to provide a sound-chamber, the sound-chamber being of greater depth than the recess, said disks being adapted to be secured together to register their respective recesses and sound-chambers, annular strips of deadening material seated in the recesses of the respective disks, a diaphragm secured between said strips; and dividing the sound-chambers into duplicate sound-chambers arranged respectively on opposite sides of the diaphragm, a sleeve projecting from each disk in open communication with the sound-chamber, and a stylus-arm secured to the diaphragm and projecting through an opening formed in one of the sleeves.

In testimony whereof I affix my signature in presence of two witnesses.

JUSTIN J. HAMMER.

Witnesses:
 SIMON HAMMER,
 H. H. HAMMER.